(12) United States Patent
Jensen

(10) Patent No.: US 6,823,684 B2
(45) Date of Patent: Nov. 30, 2004

(54) SYSTEM AND METHOD FOR COOLING AIR

(76) Inventor: Tim Allan Nygaard Jensen, 2525 Millington Dr., Plano, TX (US) 75093

(*) Notice: Subject to any disclaimer, the term of this patent is extended or adjusted under 35 U.S.C. 154(b) by 0 days.

(21) Appl. No.: 10/360,136

(22) Filed: Feb. 7, 2003

(65) Prior Publication Data

US 2003/0150226 A1 Aug. 14, 2003

Related U.S. Application Data

(60) Provisional application No. 60/354,979, filed on Feb. 8, 2002.

(51) Int. Cl.$^7$ ................................................. F28B 3/00
(52) U.S. Cl. ........................... 62/171; 62/183; 62/305; 62/506
(58) Field of Search .......................... 62/171, 305, 506, 62/121, 183, 157, 175, 99, 196.4

(56) References Cited

U.S. PATENT DOCUMENTS

| | | |
|---|---|---|
| 2,231,856 A | 2/1941 | Wetter |
| 2,655,795 A | 10/1953 | Dyer |
| 2,995,018 A | 8/1961 | Dempsey, Jr. |
| 3,108,451 A | 10/1963 | Clifford |
| 3,182,718 A | 5/1965 | Goettl |
| 3,427,005 A | 2/1969 | Kuykendall |
| 3,859,818 A | 1/1975 | Goettl |
| 3,984,995 A * | 10/1976 | Starr et al. ..................... 62/305 |
| 4,028,906 A * | 6/1977 | Gingold et al. ................ 62/183 |
| 4,066,118 A | 1/1978 | Goettl |
| 4,067,205 A * | 1/1978 | Mayhue ........................ 62/279 |
| 4,182,131 A * | 1/1980 | Marshall et al. ................ 62/91 |
| 4,199,955 A | 4/1980 | Jonsson |
| 4,204,409 A | 5/1980 | Satama |
| 4,212,172 A * | 7/1980 | Manno ......................... 62/305 |
| 4,290,274 A * | 9/1981 | Essex .......................... 62/157 |
| 4,353,219 A * | 10/1982 | Patrick, Jr. .................... 62/183 |
| 4,365,483 A | 12/1982 | Binger |
| 4,373,346 A | 2/1983 | Hebert et al. |
| 4,505,327 A | 3/1985 | Angle |
| 4,612,778 A * | 9/1986 | Medrano ...................... 62/311 |
| 4,685,308 A * | 8/1987 | Welker et al. ................ 62/171 |
| 4,918,943 A | 4/1990 | Faust |
| 4,938,035 A * | 7/1990 | Dinh ........................... 62/279 |
| 5,285,651 A * | 2/1994 | Marine ......................... 62/171 |
| 5,297,397 A | 3/1994 | Pointer |
| 5,553,463 A | 9/1996 | Pointer |
| 5,695,117 A * | 12/1997 | Sizemore et al. ......... 236/44 A |
| 5,701,748 A | 12/1997 | Phelps |
| 5,702,130 A | 12/1997 | Jostein |
| 6,237,359 B1 * | 5/2001 | Hebert ......................... 62/348 |
| 6,463,751 B1 * | 10/2002 | Teller .......................... 62/305 |

* cited by examiner

*Primary Examiner*—Marc Norman
(74) *Attorney, Agent, or Firm*—Grady K. Bergen; Robert H. Johnston, III

(57) ABSTRACT

A system and method for cooling air includes using a refrigerant cooling system and further using a refrigerant liquefaction subsystem or method that includes using a heat sink cooler ("pre-cooler") to cool the heat sink coolant before it is used to cool the refrigerant in the condenser. One aspect of the refrigerant liquefaction subsystem may use a water mist, which may be prepared by atomizers, high pressure nozzles, piezo-electric ultrasonic nebulizers, or the like, to cool the heat sink coolant.

32 Claims, 4 Drawing Sheets

SYSTEM AND METHOD FOR COOLING AIR

RELATED PATENT APPLICATION

This application claims priority of U.S. Provisional Application No. 60/354,979, filed 8 Feb. 2002, entitled, "System and Method for Cooling Air."

TECHNICAL FIELD OF THE INVENTION

The present invention relates to air conditioning systems and more particularly to a system and method for cooling air that includes an air pre-cooler and may further include an additional cooler of refrigerant.

BACKGROUND OF THE INVENTION

Refrigeration systems or evaporative systems for cooling are well-known in the art. Refrigeration is the process of removing heat from a substance or space in order to lower its temperature. To extract heat energy from the air, the air is placed in contact with a material at a lower temperature so that heat flow will occur in a descending temperature gradient. The low-temperature material is usually either a cold metal surface or a chilled-water spray. In either case, the working substance of the system is an evaporating refrigerant in a direct-expansion cooling coil or in the tubes of a water chiller. The energy absorbed is rejected typically to the outdoors through an air-cooled condenser or cooling tower. The present invention is presented in the context of cooling the airflow to an air-cooled condenser, which is a common means of heat rejection.

The refrigerants, which are certain low-boiling-point substances, are used as the working fluid or heat-transfer media of typical refrigeration systems. They are used in a cyclical thermodynamic process that involves two changes of state: between liquid and vapor and back. An example of a compression refrigeration cycle that uses a direct-expansion cooling coil is now presented.

Referring to FIG. 1, there is shown a basic compression refrigeration system 10 that has a closed refrigerant loop that is used in a compression refrigeration cycle. In this cycle, there is an alternate compression, liquefaction, expansion, and evaporation of the refrigerant. The air to be cooled is shown symbolically by arrow 12 at an initial temperature of $T_{A1}$ and flows across an evaporator 14 that removes heat from the air to produce a cooled air represented by arrow 16. The cooled air 16 is at a temperature $T_{A2}$, where $T_{A2} < T_{A1}$.

The evaporator 14 serves as the heat sink for removing the heat from the air 12. The refrigerant vaporizes there as it absorbs the heat that is removed from air 12. The evaporator 14 may take one of several forms. The evaporator 14 may be an extended surface (or finned) cooling coil with a direct-expansion system or the heat exchanger coils of a water chiller for chilled water systems.

The heat in air 12 is delivered to the refrigerant in evaporator 14 and the refrigerant, which is then at a pressure of $P_{R2}$ and a temperature of $T_{R2}$, is delivered to compressor 18. The compressor 18 is a device for accomplishing primarily two functions. First, it removes vapor from the evaporator 14 at a rate that permits steady state conditions of low temperature and low pressure in the evaporator 14. Second, the compressor 18 discharges the vapor at a pressure ($P_{R3}$) and temperature ($T_{R3}$) high enough to permit heat rejection along a descending temperature gradient to the air or water of the condenser 20.

In the condenser 20, the heat originally removed from air 12 plus the heat equivalent of the work performed in the compressor 18 are rejected to the condenser coolant (air or water) and ultimately to the outside air or earth. The compression and removal of the heat from the refrigerant operate to return it to a liquid state at the condenser pressure, and the liquid refrigerant is collected by liquid receiver 22. From there, the refrigerant is delivered to an expansion valve 24. The expansion valve 24 produces a sudden drop in refrigerant pressure (i.e., $P_{R4} \gg P_{R1}$) and that in turn creates a sudden drop in temperature, $T_{R4} \gg T_{R1}$. And it regulates the flow of refrigerant producing a uniform evaporating temperature for evaporator 14.

In a typical packaged air conditioning (rooftop unit) or split air conditioning system, the compressor 18 and condenser 20 are located in a single unit outside the house or building. The compressor-condenser unit has a hermetically sealed compressor and motor in the middle of finned-tube air-cooled condenser forming the sides of a u-shaped (or similar) housing. The unit has a condenser fan and motor located on a top portion of the housing to provide a flow of outside, ambient air across the condenser fins and out of an open top portion. The size of systems varies according to the cooling needs.

The cooling load on a space to be conditioned is substantially linear on a graph if the cooling load is placed on the ordinate and the outside temperature on the abscissa. Typically an air conditioning unit's cooling capacity versus temperature is also nearly linear on the same graph with high cooling capacity at lower outdoor temperatures and less cooling capacity at higher temperatures. For example, a Carrier 48TJ006 (5 Ton) unit developing air at the evaporator at 67 F will have a cooling capacity of 65.5 MBtu/hr. at 85 F., but only 56.5 at 105 F, which is a drop of about 14% capacity as the outside temperature went from 85 to 105 F. There is also about a 13% increase in power consumption at the higher outdoor temperature. Cumulatively, there is a reduction in efficiency of about 24%. This type of information is used to size air conditioning systems for a given space and conditions.

The American Society of Heating, Refrigeration and Air-Conditioning (ASHRAE) provides guidelines for helping to size a unit for a given application. ASHRAE set the standards by which one sizes unless an ordinance requires otherwise. To size the air conditioning unit, the intersection of the linear (or nearly linear) capacity of the air conditioner with the linear loading profile of the space is located for the maximum design temperature for the outside, ambient air. If a system goes above the maximum temperature for which the unit was sized, the air conditioning unit will never catch up and cool the space down to the desired temperature. To conservatively size the unit to handle the hottest days of the year, a substantial amount of the required capacity is needed just for the hottest days. For example, a 5-ton unit might be needed to handle the hottest days, but in fact a 4-ton unit would do well for the vast majority of the year. It would thus be nice to size a unit to handle the majority of the temperature range without being unduly influenced by the end point—i.e., the hottest days.

Numerous efforts have previously been made to enhance the design of air conditioning systems and particularly air conditioning systems that reject heat through air cooled condensers. Some approaches have involved adding supplemental refrigerant coolers and some that have tinkered with the condenser cooler itself. For example, U.S. Pat. No. 5,553,463 describes a system that includes a supplemental condenser for cooling the refrigerant with a closed-water loop that has a cooling tower. The refrigerant is cooled some by the closed-water system before going to the condenser coil. Improvements remain desirable.

SUMMARY OF THE INVENTION

Therefore, a need has arisen for a system and method for cooling air that address shortcomings of previous systems and methods. According to an aspect of the present invention, a method for cooling air with a refrigerant system is provided that includes the steps of passing air, which is at a temperature $T_{A1}$ and is to be cooled, over an evaporator that contains a refrigerant that becomes vaporized and that removes heat from the air to produce conditioned air at a temperature $T_{A2}$, where $T_{A2}<T_{A1}$; passing the refrigerant to a compressor where the vaporized refrigerant is compressed; passing the refrigerant to a condenser unit that removes heat from the refrigerant such that between the refrigerant passing the compressor and condenser substantially all the refrigerant is placed in a liquid state; passing the refrigerant to an expansion device that expands the refrigerant while passing it to the evaporator that allows for the refrigerant to be vaporized in the evaporator as the air at $T_{A1}$ is cooled; passing a first heat-sink coolant at a temperature $T_{HS1}$ over a heat-sink coolant cooler (which may also be referred to as "pre-cooler" and which may use atomized mist or other means) to lower the temperature of the heat-sink coolant to a temperature $T_{HS2}$ and to thereby form a second heat-sink coolant; and passing the second heat-sink coolant over the condenser to remove heat from the refrigerant in the condenser. In another embodiment, the method includes the steps of supplying air over two condenser coils and supplying water directly on one of the coils to cool the coil but also to cool the air going over before it encounters the other coil. In another embodiment, the method includes cooling the refrigerant in part with a heat exchanger and using the rejected heat to assist in heating a water supply reservoir. According to other aspects of the present invention, a controller may be used to control the operation of a refrigerant cooling system to regulate how much water is used compared to how much electricity is used. In another embodiment, the controller maybe designed for remote operation by, for example, the electric power company. This summary is not complete; please refer to the claims at end.

The present invention provides advantages; a number of examples follow. An advantage of the present invention is that it allows for lower (compared with similar units not incorporating the invention) electrical energy consumption during the hottest times of the year—the times when electrical companies experience peak demand. An advantage of the present invention is that air conditioning units can be sized for temperatures closer to average summer temperature rather than peak or maximum summer temperature. Another advantage is that the present invention will allow smaller, relatively less expensive units. Another advantage is that the small units will run for longer duration, and therefore, remove more water vapor from the air and thereby improve humidity control. Yet another advantage of the present in invention, in one embodiment, is that an existing air conditioner with an air cooled condenser can be retrofitted to use less electricity and to increase its cooling capacity.

BRIEF DESCRIPTION OF THE DRAWINGS

For a more complete understanding of the present invention and advantages thereof, reference is now made to the following description taken in conjunction with the accompanying drawings in which like reference numbers indicate like features, and wherein.

DETAILED DESCRIPTION OF THE INVENTION

The preferred embodiment of the present invention and its advantages are best understood by referring to FIGS. 2–7 of the drawings, like numerals being used for like and corresponding parts of the various drawings.

Figure 1:
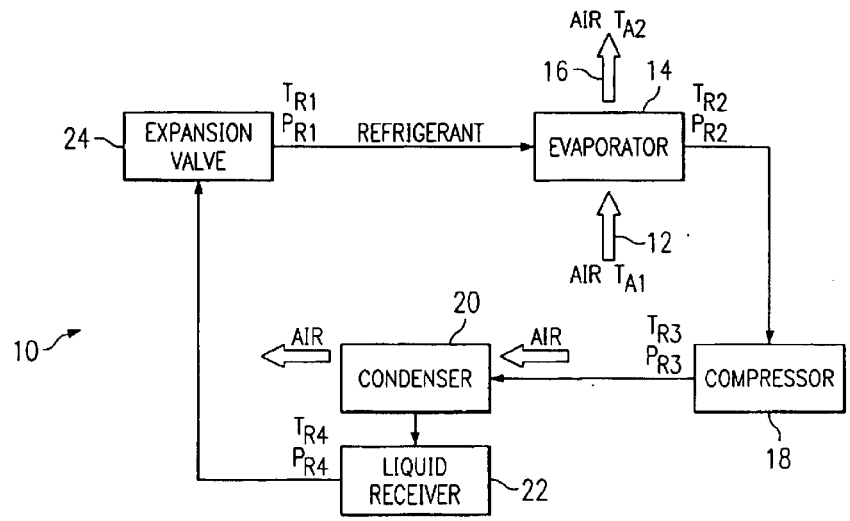
FIG. 1 is a prior art schematic diagram of a refrigeration-compression cooling system.
Figure 2:
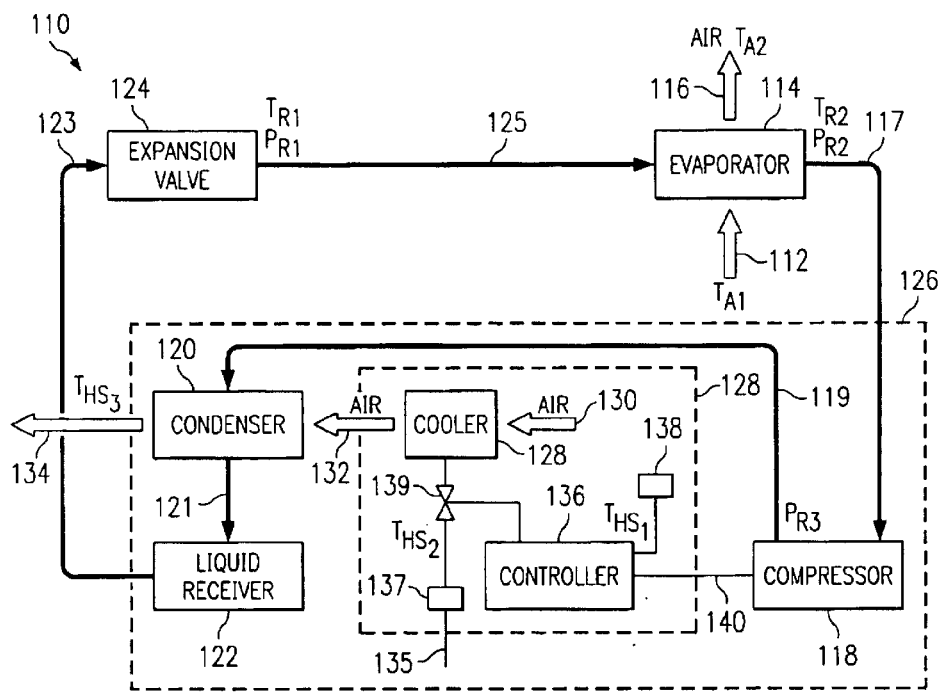
FIG. 2 is a schematic diagram of a cooling system according to one embodiment of the present invention.

Referring to FIG. 2, there is shown a system 110 for cooling a conditioned space or air represented by arrow 112. Air 112, which is at a temperature $T_{A1}$, passes across an evaporator 114 that removes heat from air 112 to produce cooled or conditioned air represented by arrow 116, which is at a temperature $T_{A2}$. The heat removed in evaporator 114 is delivered to a refrigerant within the evaporator 114. The refrigerant is at a temperature $T_{R1}$ and a pressure $P_{R1}$ before entering the evaporator 114. The heat rejected from air 112 to the refrigerant in the evaporator 114 vaporizes the refrigerant and may raise the temperature to $T_{R2}$. The refrigerant is delivered from evaporator 114 to compressor 118 by conduit 117.

The compressor 118 increases the pressure of the refrigerant from $P_{R2}$ to $P_{R3}$ (i.e., $P_{R2}<P_{R3}$). The compressed refrigerant is then delivered by conduit 119 to condenser 120. There the refrigerant is cooled to form a refrigerant that is in a liquid state. The liquid refrigerant is delivered by conduit 121 to liquid receiver 122. The refrigerant is then delivered by conduit 123 to an expansion device or valve 124, which regulates the flow and lowers the pressure as necessary for delivery by conduit 125 to the evaporator 114 at temperature $T_{R1}$, and thus forms the final portion of a closed refrigerant loop.

The aspect of system 110 that receives the vaporized, heated refrigerant and produces a liquid state refrigerant may be referred to as the refrigerant-liquefaction subsystem 126 or the "condensing unit." The subsystem 126 includes compressor 118, condenser 120, liquid receiver 122 (which can be integral with the condenser), and importantly further includes a heat-sink coolant cooler or heat-sink air cooler subsystem 128. According to an aspect of the invention, subsystem 128 may take numerous forms that may further include features to automate it to operate only when needed in extreme ambient heat.

In the embodiment shown, subsystem 128 includes a cooling unit 128 that receives ambient, outside air or heat-sink air represented by arrow 130 at a temperature $T_{HS1}$. It is referred to as heat-sink air since it serves as the heat sink for the condenser 120. The subsystem 128 cools the air 130 down to $T_{HS2}$ to form a second heat-sink air represented by arrow 132. Heat-sink air 132 then flows across the condenser 120 to remove heat from the refrigerant in the condenser and then exits with a temperature $T_{HS3}$ as shown by arrow 134. An advantage of this embodiment is that $T_{HS2}<T_{HS1}$, which improves and increases the heat rejection of the condenser 120.

The heat-sink air cooler subsystem 128 further may include a controller 136 that is coupled to a plurality of transducers represented by sensor or transducer 138 and may be further coupled to the compressor motor as suggested by connection 140. The controller 136, which contains a microprocessor, is operable to monitor the transducers 138, which measure various characteristics of the initial outside air 130, such as wet-bulb temperature and dry-bulb temperature (or enthalpy), and to monitor the load on the compressor through connection 140. The compressor load could be monitored by measuring motor current or refrigerant discharge temperature, $T_{R3}$. With this information, the controller 136 can determine the amount cooling needed by subsystem 128, if any.

To control the cooling of unit 128, the controller 136 can adjust the liquid flow rate for cooler 128 when the cooler 128 is the preferred atomizer type described further below. A water supply line 135 provides water to cooler 128. Water supply line 135 includes a water-treating unit 137 (e.g., water softener, water filter, reverse osmosis filter, and/or other water treatment devices) and a control valve 139. Controller 136 has the ability to couple and adjust valve 139. Water treatment device 137 may be added in places where the water needs to be softened or filtered to minimize the possibility that the nozzles or devices used in cooler 128 will become clogged by contaminants (lime, calcium, carbonates, etc.). Water treatment device 137 may also be an intense magnetic field, which may alter the mineral deposits from calcite to aragonite. The water demands for the system is not very high; for example, a five-ton unit would only need about several gallons an hour. One may wish to employ a water softener or filter when the water hardness exceeds about 3 to 5 grains per gallon. As an additional benefit, the conditioned water may allow for water to be applied directly on to the surface of the condenser coils if desired without substantial problems from mineral deposits.

Controller 136 may further adjust baffles and by-pass doors if the supplemental cooling of subsystem 128 is not necessary or is not efficient under the current conditions. With respect to the latter, the controller 136 may be programmed to include the current price of water used by cooler 128 and the price of electricity to help economically optimize use of the overall system 110. Controller 136 may be tied (by telephone line or wireless systems) into the electrical company who could remotely indicate when it needs the system 110 to use subsystem 128 to lower the electrical load on the system 110 (the electrical companies are motivated to give price breaks for this type of control).

In some embodiments, it may be desirable to forego a controller and use a system that is either on or off or to use a system with simple timing circuit. As an example of the latter, the timer may activate the cooler 128 only during the hottest hours of the day or possibly when the compressor has operated continuously for more than 20 minutes.

The water used by cooler 128 is primarily evaporated to cool the air 130. Accordingly, very little water must be disposed of through a drain or otherwise. The atomizers of one embodiment of cooler 128 spray only enough water to evaporate—there is no need to re-circulate water and no need for a cooling tower. Because there is no re-circulation, any contaminants in the water do not build up. The subsystem 128 is preferably designed to be used only during the hottest times of the year, but has considerable influence on the efficiency since that is a design point.

By reducing the temperature of air 130 from a temperature of, for example, 105 F to 85 F, the cooling capacity of a given air conditioning system 110 is increased while simultaneously decreasing the electrical usage. As a specific example, a five-ton Carrier Unit (model No. 38CKS060) would experience an increased capacity of about 11.5% while the kilowatt usage decreases about 17.9%. These combine to improve the energy efficiency ratio (BtuH of cooling per Watt of input power) from about 8.0 to 10.9—that is a 35.8% improvement. A fraction of the savings is offset by water usage and/or increasing condenser fan power, but the remaining savings is still substantial.

Cooler 128 may take a number of different forms that use water mist or spray to cool the air (or other condenser coolant). Domestic water may be used or water may be pumped to a high pressure and sprayed through stainless steel nozzles to produce sub-one-micron mist or spray. Alternatively, piezo-electric ultrasonic nebulizers or atomizers may be used. The nebulizers and atomizers produce more of a fog than a spray. The spray or mist increases the water surface area, which decreases the time or travel length required for evaporation and eliminates the possibility of standing water. It is probably good to avoid standing water since it could develop a bacteria issue or a mosquito larvae habitat.

As described in connection with FIG. 3, the refrigerant-liquefaction subsystem (e.g., 126 in FIG. 2) may be placed in a housing that further augments the performance by providing baffling or intake nozzles of a spiral shape or other shapes that increase the vorticity of the air flow therein. The baffles can be made from many types of materials, such as of simple sheet metal or injection molded plastic parts. The baffles may go in and be curved to impart a swirl or any other vortex generating design might be used. This increases the total velocity of the airflow, which increases the heat transfer rate by improving the convection coefficient. It also increases the total travel length of the airflow, giving more distance for the fine water droplets or mist to evaporate. This in turn further lowers the dry-bulb temperature. In addition, motorized dampers can be added downstream of the mist nozzles for a dual purpose. They can be fully open when the cooler 228 is off in order to increase overall airflow and minimize pressure losses and condenser fan power required. They can also be modulated to improve mixing and evaporation when the cooler 228 is on. In either case, the controller 236 may be connected to the dampers to control them as desired.

Figure 3:
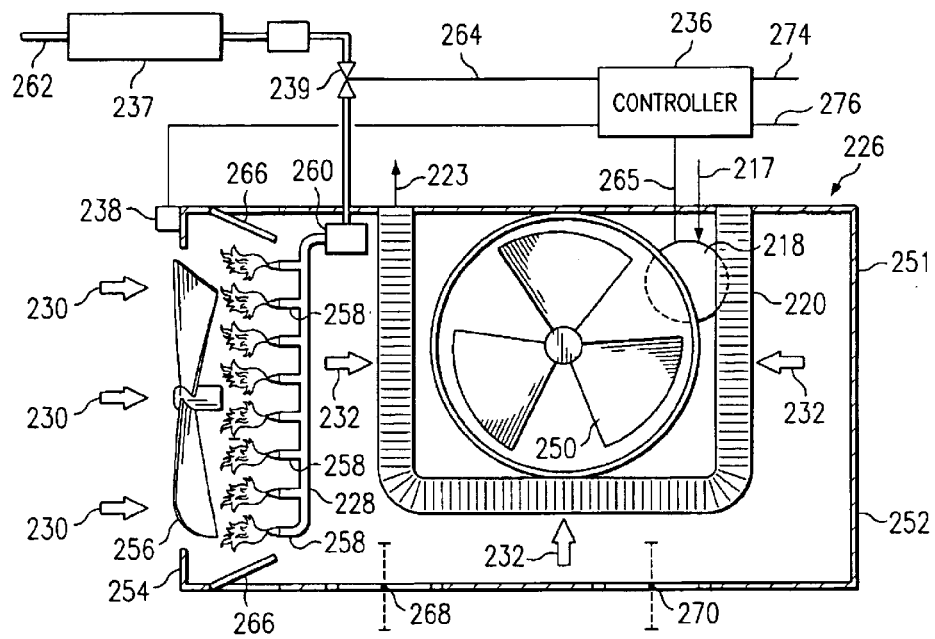
FIG. 3 is a schematic plan view of a refrigerant-liquefaction subsystem according to an aspect of the present invention that is well suited for retrofitting existing air conditioning systems.

Continuing to reference FIG. 3, a refrigerant-liquefaction subsystem 226 is shown that may be used as part of a residential or other split-system air conditioning system, such as system 110 of FIG. 2. In subsystem 226, the refrigerant is delivered by conduit 217 from the evaporator to compressor 218. Compressor 218 compresses the refrigerant and delivers it to the condenser 220. In particular, it delivers the refrigerant to the condenser coils that surround a condenser fan 250. The cooled refrigerant is then delivered to conduit 223 from where it is delivered to an expansion valve and on through the remaining portions of a closed-loop refrigerant system. The illustrative embodiment of subsystem 226 is particularly well suited for retrofitting existing residential air conditioning systems.

In retrofitting a typical split-system air conditioning system, a cooling box 251 is formed by panels or baffling 252 around the coils 220 as shown. The panels 252 may include insulation to minimize heat transfer with the first heat-sink air. The panels 252 form most of box 251 that directs airflow from an opening on the first end 254 to an opening over the condenser fan 250. The opening on the first end 254 may contain a heat-sink air cooling fan 256 that supplements fan 250 and pulls outside, ambient air 230 past a cooler or cooling unit 228. There can also be a second opening, second heat-sink fan, and second atomizer zone on the second end of the enclosure.

In this embodiment, cooling unit 228 is formed by a plurality of atomizing nozzles 258 that form a water mist in what may be referred to as a mist zone downstream of the fan 256. The distance between the first opening and the condenser is selected to allow substantially all of the atomized water to evaporate before it arrives at the condenser coils. Alternatively, with treated water, the atomized water may not all evaporate before the condenser coils and would actually moisten the coils directly as well. To make a smaller (shorter) unit, internal baffles may be used to make the internal flow path longer.

Atomizers are preferred that make a fine mist or droplets of water that are added to the air to evaporatively cool it to form a cooled heat-sink air 232. With good evaporation the temperature will approach the wet-bulb temperature. The cooled heat-sink air 232 then travels across condenser 220, through fan 250, and out the top of the box 251. The cooling unit 228 has a water supply line 262 and may further include a pump 260. Line 262 preferably includes a water conditioning or treatment unit 237 and a control valve 239. A programmable controller 236 may be provided to control the operation of subsystem 226 or aspects of it.

The controller 236 may be coupled to a plurality of sensors or transducers represented by transducer 238 to measure the conditions of air 230. The controller 236 may also be coupled by a connection to control valve 239 and by connection 265 to compressor 218. The controller 236 uses a microprocessor and programming to receive inputs from the transducers and devices 238 and to adjust the flow of valve 239 and also may control baffling such as 266 or bypass doors such as 268 and 270. Doors 268 and 270 are shown in the closed position and in broken lines in the open or by-pass position. The electrical connections of the moveable baffling and gates to the controller are symbolically depicted by connections 274 and 276 off of the controller. As with the previous embodiment, the controller may also be tied into the electrical/power company who could remotely control the extent to which the subsystem 226 operates.

Figure 4:
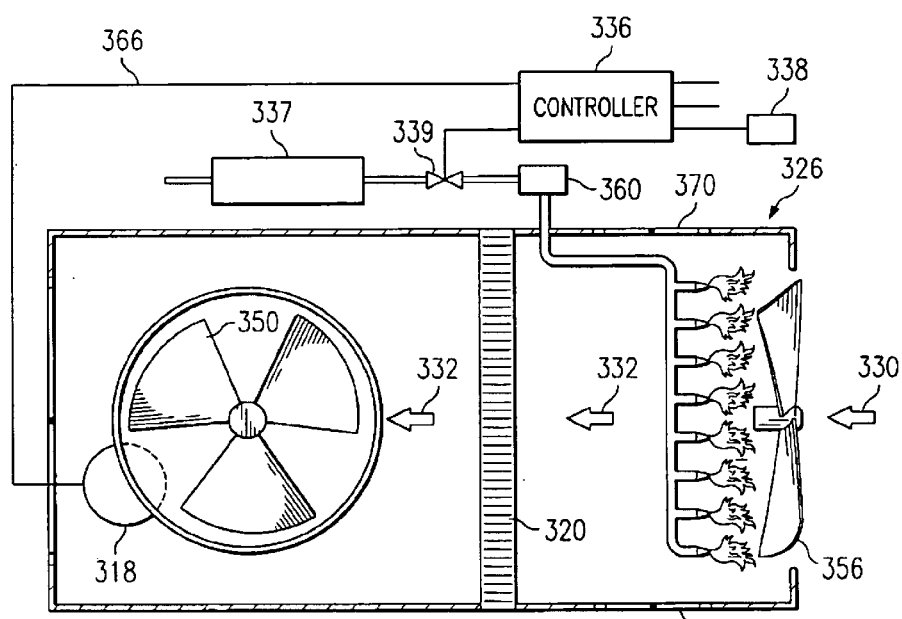
FIG. 4 is a schematic plan view of a refrigerant-liquefaction subsystem for an air cooling system as might be implemented by an original equipment manufacture.

Referring now to FIG. 4, there is shown a refrigerant-liquefaction subsystem 326 that may be more desirable for use by an original equipment manufacturer (OEM). The subsystem 326 is analogous in most respects to subsystem 226 of FIG. 3, except for the condenser 320 can be readily placed in other positions as desired for ease of manufacture. With a factory built model, the manufacturer may be able to use less condenser coils. Corresponding parts between FIG. 4 and FIG. 3 are shown with the same reference numerals except 100 has been added to each. The OEM may choose to increase the horsepower of fan 350 and eliminate the need for supplemental fan 356 (which is optional).

Figure 5:
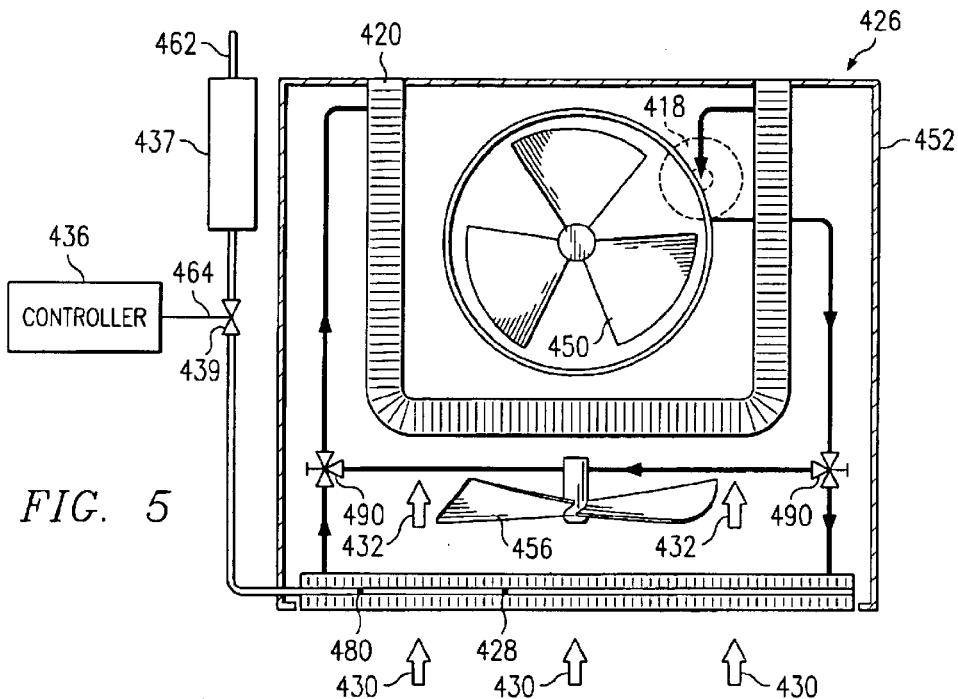
FIG. 5 is a schematic plan view of a refrigerant-liquefaction subsystem for an air cooling system according to another aspect of the present invention.

Referring now to FIG. 5, another embodiment of a refrigerant-liquefaction subsystem 426 is presented. Subsystem 426 is similar in most respects to subsystem 226 of FIG. 3, except that a supplemental condensing coil 480 replaces the mist nozzles 258. Coil 480 may be of the same material and manufacture as coil 420 or it may be TEFLON (or similar coating) coated to improve its resistance to mineral build-up. Similar to FIG. 3, the water is supplied through conduit 462 and may be filtered, treated, and/or softened by water treatment unit 437. The water flow is controlled by valves 439 and controller 436. In this embodiment, the water is dripped from openings in conduit 428 directly onto coil 480.

Coil 480 not only provides a surface for evaporating the water to precool the airflow 432, but it also substantially increases the total condenser coil area further enhancing the refrigerant liquefaction process. The supplemental fan 456 may not be necessary if the free area for airflow of coil 480 is comparable or greater than that of coil 420.

Two bypass valves 490 allow for the removal of coil 480 for cleaning (e.g., removal of any mineral deposits). In areas where the water is particularly hard, e.g., greater than 10 grains per gallon or where the water is moderately hard and a water treatment unit 437 is not employed, cleaning will be necessary. With coil 480 temporarily removed, the refrigerant flows through bypass conduit 492 and the remaining unit 426 can still operate.

Figure 6:
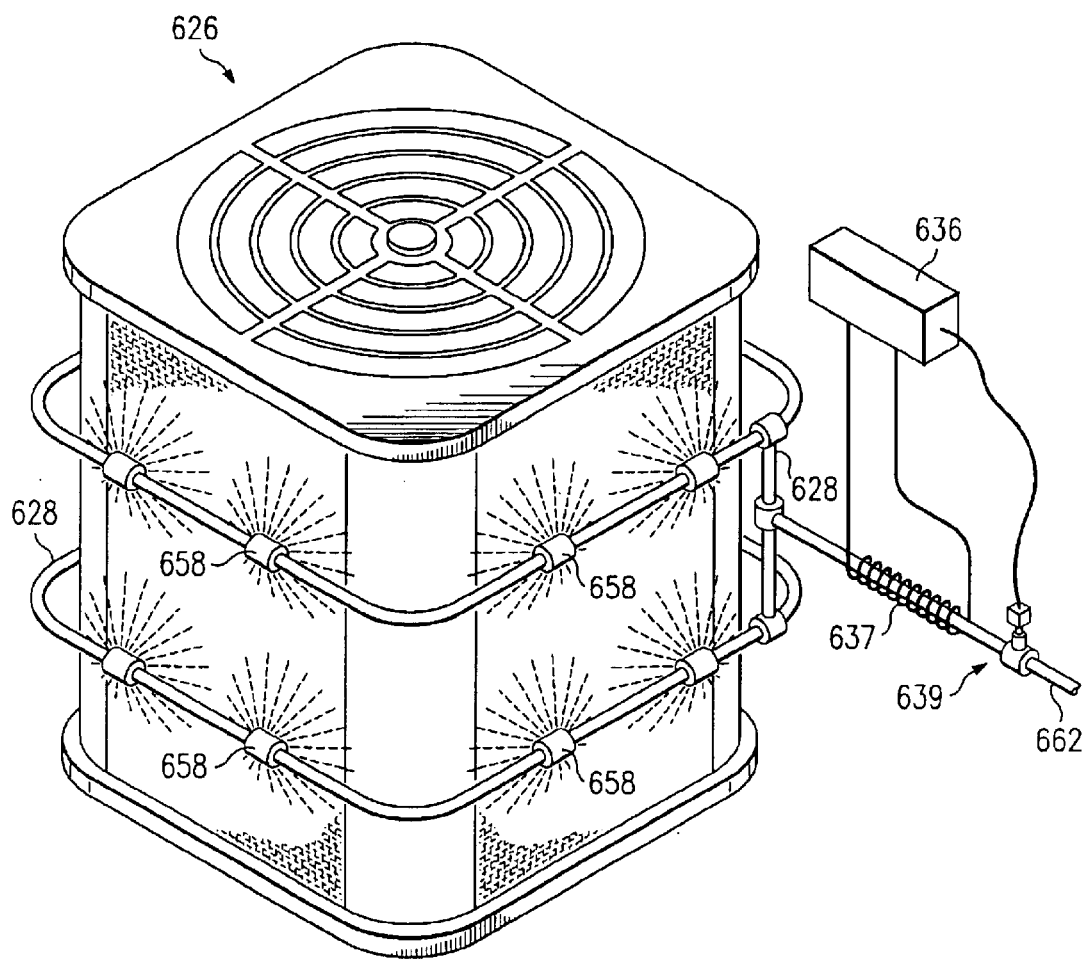
FIG. 6 is a schematic plan view of a refrigerant-liquefaction subsystem according to an aspect of the present invention.

Referring to FIG. 6, another embodiment of the refrigerant-liquefaction subsystem 626 is presented. Subsystem 626 is well suited for tight locations and where substantial performance enhancement with minimal cost is desired. In this subsystem, a mist is produced by multiple atomizer or mister nozzles 658 placed around the condenser coils (like 220 in FIG. 3). Domestic water under normal city or municipal pressure, enters subsystem 626 through conduit 662. A water treatment device 637, which in this embodiment is shown as a coil producing an intense magnetic field, may be placed on conduit 662. The treatment device 637 and an automated control valve 639 are selectively energized by programmable controller 636. When valve 639 is open, water passes into conduit network 628 and is distributed to nozzles 658. Nozzles 658 supply a mist or droplets onto the condenser coils. This embodiment provides easy installation of the subsystem on an existing air conditioner and provides easy access to the nozzles 658.

Figure 7:
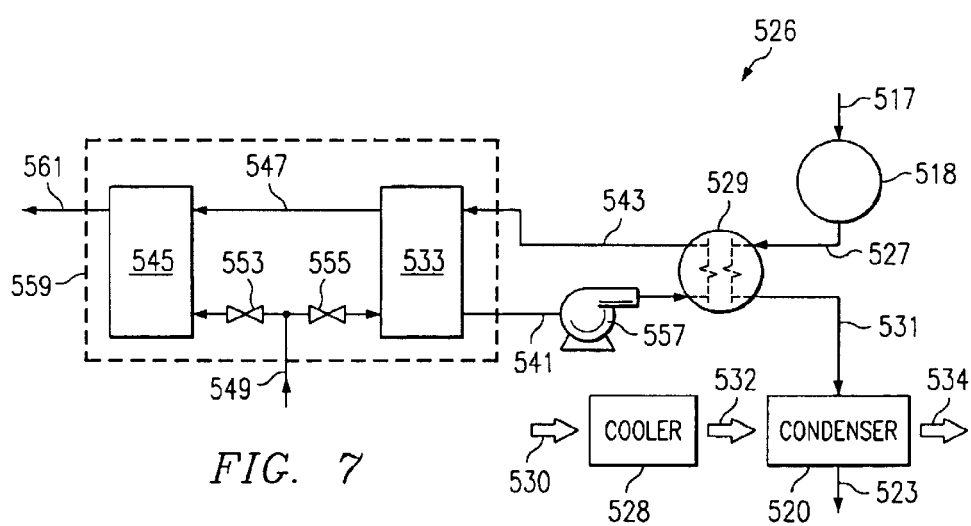
FIG. 7 is another schematic diagram of a refrigerant-liquefaction subsystem according to an aspect of the present invention that is well suited to building that also require large amounts of hot water such as restaurant kitchens and laundries.

Referring to FIG. 7, another embodiment of a refrigerant-liquefaction subsystem 526 is presented. Subsystem 526 is particularly well suited for use in locations that require large quantities of hot water, e.g., restaurants, hotels, and laundries. The refrigerant from the evaporator is delivered by conduit 517 to compressor 518, where it is compressed. The heated refrigerant is delivered by conduit 527 to heat exchanger 529 and then by conduit 531 to condenser 520. Heat sink air cooler subsystem 528 receives ambient air 530, cools it, and delivers the air 532 to condenser 520 where it is discharged 534. The condenser 520 cools the refrigerant and then it is delivered by conduit 523 to the evaporator. The heat exchanger 529 may alternatively be located on conduit 523 and receive refrigerant after it has exited condenser 520.

An important aspect of this embodiment, is the heat exchanger 529 and related aspects. The heated refrigerant in exchanger 529 rejects heat to water delivered from a water supply tank 533 by conduit 541. The water that receives the heat in the exchanger 529 is delivered by conduit 543 back to tank 533. Tank 533 is used, at least when compressor 518 is operating, as a water supply to water heater 545. The supply water is delivered by conduit 547. Heated water is supplied to other locations from the heater 545 by conduit 561.

As hot water is used through conduit 561, it is made up from the cold water supply line 549. Water can be supplied to heater 545 or tank 533. When the condenser 518 is operating, valve 553 may be closed and valve 555 opened so tank 533 is used as the source of hot water to make up water in heater 545. In that case, water is supplied from 549 to tank 533. Pump 557 is used to pump water from tank 533 to the heat exchanger 529 and back to tank 533. By using heat exchanger 529, the performance efficiency of the subsystem 526 is improved with respect to rejection of heat and by supplying heat to the water of tank 533, the performance of the water heating unit 559 is also improved. Note improved performance gained with respect to the heating unit 559 could be obtained even if heat sink cooler subsystem 528 were excluded.

Although the present invention and its advantages have been described in detail, it should be understood that various changes, substitutions and alterations can be made therein without departing from the spirit and scope of invention as defined by the appended claims. Among other things, the possible changes include mixing and matching features of the various embodiments.

What is claimed is:

1. A method for cooling air with a refrigerant system, the method comprising:

passing air, which is at a temperature $T_{A1}$, that is to be cooled over an evaporator that contains a refrigerant that becomes vaporized and that removes heat from the air to produce conditioned air at a temperature $T_{A2}$, where $T_{A2} < T_{A1}$;

passing the refrigerant to a compressor where the vaporized refrigerant is compressed;

passing the refrigerant to a condenser unit that removes heat from the refrigerant such that between the refrigerant passing the compressor and condenser, substantially all the refrigerant is placed in a liquid state;

passing the refrigerant to an expansion device that expands the refrigerant while passing it to the evaporator, which allows for the refrigerant to be vaporized in the evaporator as the air at $T_{A1}$ is cooled;

passing a first heat-sink coolant at a temperature $T_{HS1}$ over a heat-sink coolant cooler to lower the temperature of the heat-sink coolant to a temperature $T_{HS2}$ to form a second heat-sink coolant; and passing the second heat-sink coolant over the condenser to remove heat from the refrigerant in the condenser; and further comprising adjusting the extent of cooling performed by the heat-sink coolant cooler with a controller coupled to the coolant cooler by operating the controller upon instruction from a remote, off-premise location to adjust the extent of cooling performed by the heat-sink coolant cooler.

2. The method of claim 1, wherein the first heat-sink coolant comprises air and wherein the step of passing a first-heat sink coolant over the heat-sink coolant cooler comprises the step of passing the first heat-sink coolant through an atomized mist of water.

3. The method of claim 2, further comprising treating a water supply to remove or neutralize contaminants and supplying the treated water to an atomizer that produces the atomized mist of water.

4. The method of claim 1 further including the step of placing treated, atomized water directly on the condenser.

5. The method of claim 4, further comprising treating a water supply to remove minerals and supplying the treated water to an atomizer that produces the atomized water to be sprayed on the condenser.

6. The method of claim 1 further comprising monitoring characteristics of the first heat-sink coolant with sensors coupled to the controller and using the controller to adjust the extent of cooling performed by the heat-sink coolant cooler.

7. The method of claim 1, wherein the first heat-sink coolant comprises air and wherein the step of passing a first-heat sink coolant over the heat-sink coolant cooler comprises the step of passing the first heat-sink coolant through a mist of water prepared with a piezo-electric ultrasonic nebulizer.

8. The method of claim 1, wherein the first heat-sink coolant comprises air and wherein the step of passing a first-heat sink coolant over the heat-sink coolant cooler comprises the step of passing the first heat-sink coolant through a mist of water prepared with nozzles.

9. The method of claim 1, wherein:

a power-providing entity controls the water flow from the remote, off-premise location.

10. The method of claim 9, wherein:

the water flow is controlled by the power-providing entity based upon at least one of ambient temperature conditions and power consumption.

11. An improved refrigerant cooling system comprising:

an evaporator for removing heat from the air to be cooled such that the temperature is lowered from $T_{A1}$ to $T_{A2}$ and whereby the removed heat is delivered to the refrigerant in the evaporator and whereby the refrigerant is vaporized, a compressor fluidly coupled to the evaporator to receive refrigerant therefrom and to increase the pressure of the refrigerant, a condenser fluidly coupled to the compressor for receiving refrigerant from the compressor and cooling the refrigerant, whereby the compressor and condenser are operable to convert the refrigerant to a liquid state, and an expansion valve fluidly coupled to the condenser for receiving liquid refrigerant from the condenser and for lowering the pressure of the refrigerant, the expansion valve also being fluidly coupled to the evaporator for delivering the refrigerant to the evaporator;

a heat-sink coolant cooler subsystem that uses sprayed water to cool a heat-sink coolant before it passes over the condenser; and a controller coupled to the coolant cooler subsystem, the controller being operable upon instruction from a remote, off-premise location for adjusting the extent of cooling performed by the heat-sink coolant cooler subsystem.

12. The system of claim 11 wherein the condenser has a fan and wherein the heat-sink-coolant cooler subsystem comprises:

a device for producing a water mist; and a means for moving ambient air through the water mist and then across the condenser.

13. The system of claim 12 wherein the device for producing a water mist comprises an atomizer.

14. The system of claim 12 wherein the device for producing a water mist comprises a pressure water nozzle.

15. The system of claim 12 wherein the device for producing a water mist comprises a piezo-electric ultrasonic nebulizer.

16. The system of claim 12 further comprising:

a plurality of sensors for measuring characteristics of the heat-sink coolant and the compressor load, the controller being coupled to the plurality of sensors and to the heat-sink coolant cooler subsystem, the controller operable to control the severity of cooling performed by the heat-sink cooler subsystem in response to inputs from the sensors.

17. A refrigerant cooling system comprising:

an evaporator for removing heat from the air to be cooled such that the temperature is lowered from $T_{A1}$ to $T_{A2}$ and whereby the removed heat is delivered to the refrigerant in the evaporator and whereby the refrigerant is vaporized;

a refrigerant liquefaction subsystem comprising:

a compressor fluidly coupled to the evaporator to receive refrigerant therefrom and to increase the pressure of the refrigerant, a condenser fluidly coupled to the compressor for receiving refrigerant from the compressor and cooling the refrigerant, whereby the compressor and condenser are operable to move the refrigerant to a liquid state, and a heat sink air cooler unit for cooling air that is used as the heat sink for the condenser;

an expansion valve fluidly coupled to the condenser for receiving liquid refrigerant from the condenser and for lowering the pressure of the refrigerant, the expansion valve also being fluidly coupled to the evaporator for delivering the refrigerant to the evaporator;

wherein the refrigerant liquefaction subsystem further comprises:

a condenser fan, an enclosure formed of panels and formed with a first opening on a first end and a second opening proximate the condenser fan, a water supply line, a control valve coupled to the water supply line for selectively controlling the water flow in the water supply line, a plurality of water atomizers coupled to the water supply line downstream of the control valve, the atomizers operable to produce a water mist that is delivered to a water mist zone;

a controller having a microprocessor, the controller coupled to the control valve, a by-pass gate formed on a portion of the enclosure;

a by-pass gate actuator coupled to the by-pass gate for selectively opening closing the by-pass gate, and wherein the actuator is coupled to the controller, a plurality of sensors coupled to the controller, the sensors operable to measure the wet-bulb temperature and dry-bulb temperature of air located on an outside portion of the enclosure; and wherein the controller is programmed with prices of electricity and water and programmed to monitor inputs from the sensors and to selectively control the control valve and by-pass gate to cool the heat-sink air with the atomizers or to by-pass the atomizers to optimize cost savings.

18. The system of claim 17 wherein the refrigerant liquefaction subsystem further comprises: a heat-sink air fan disposed in the first opening of the enclosure, and a water treatment unit for receiving water and removing any undesired contaminants and delivering treated water to a water supply line.

19. A refrigerant cooling system comprising:

an evaporator for removing heat from the air to be cooled such that the temperature is lowered from $T_{A1}$ to $T_{A2}$ and whereby the removed heat is delivered to the refrigerant in the evaporator and whereby the refrigerant is vaporized;

a refrigerant liquefaction subsystem comprising:

a compressor fluidly coupled to the evaporator to receive refrigerant therefrom and to increase the pressure of the refrigerant, a condenser, which has a bypassable first condenser coil end a second condenser coil, the condenser fluidly coupled to the compressor for receiving refrigerant from the compressor and cooling the refrigerant, whereby the compressor and condenser are operable to convert the refrigerant to a liquid state, and a water supply line for supplying water directly onto the first condenser coil;

an expansion valve fluidly coupled to the condenser for receiving liquid refrigerant from the condenser and for lowering the pressure of the refrigerant, the expansion valve also being fluidly coupled to the evaporator for delivering the refrigerant to the evaporator.

20. A refrigerant cooling system comprising:

an evaporator for removing heat from the air to be cooled such that the temperature is lowered from $T_{A1}$ to $T_{A2}$ and whereby the removed heat is delivered to the refrigerant in the evaporator and whereby the refrigerant is vaporized;

a compressor fluidly coupled to the evaporator to receive refrigerant therefrom and to increase the pressure of the refrigerant;

a condenser fluidly coupled to the compressor for receiving refrigerant from the compressor and cooling the refrigerant, whereby the compressor and condenser are operable to convert the refrigerant to a liquid state;

an expansion valve fluidly coupled to the condenser for receiving liquid refrigerant from the condenser and for lowering the pressure of the refrigerant, the expansion valve also being fluidly coupled to the evaporator for delivering the refrigerant to the evaporator;

a heat-sink coolant cooler subsystem that uses water to cool a heat-sink coolant before the heat-sink coolant passes over the condenser; and a controller that is operable upon instruction from a remote, off-premise location for adjusting the extent of cooling performed by the heat-sink coolant cooler subsystem.

21. The system of claim 20, wherein:

the controller is wirelessly operable from the remote, off-premise location.

22. A method for cooling air with a refrigerant system, the method comprising:

passing air, which is at a temperature $T_{A1}$, that is to be cooled over an evaporator that contains a refrigerant that becomes vaporized and that removes heat from the air to produce conditioned air at a temperature $T_{A2}$, where $T_{A2}<T_{A1}$;

passing the refrigerant to a compressor where the vaporized refrigerant is compressed;

passing the refrigerant to a condenser unit that removes heat from the refrigerant such that between the refrigerant passing the compressor and condenser, substantially all the refrigerant is placed in a liquid state;

passing the refrigerant to an expansion device that expands the refrigerant while passing it to the evaporator, which allows for the refrigerant to be vaporized in the evaporator as the air at $T_{A1}$ is cooled;

passing a first heat-sink coolant at a temperature $T_{HS1}$ over a heat-sink coolant cooler to lower the temperature of the heat-sink coolant to a temperature $T_{HS2}$ to from a second heat-sink coolant; and passing the second heat-sink coolant over the condenser to remove heat from the refrigerant in the condenser; and wherein the first heat-sink coolant comprises six and wherein the step of passing a first-heat sink coolant over the heat-sink coolant cooler comprises the step of passing the first heat-sink coolant through a mist of water prepared with a piezo-electric ultrasonic nebulizer.

23. A method for cooling air with a refrigerant system, the method comprising:

passing air, which is at a temperature $T_{A1}$, that is to be cooled over an evaporator that contains a refrigerant that becomes vaporized and that removes heat from the air to produce conditioned air at a temperature $T_{A2}$, where $T_{A2}<T_{A1}$;

passing the refrigerant to a compressor where the vaporized refrigerant is compressed;

passing the refrigerant to a condenser unit that removes heat from the refrigerant such that between the refrigerant passing the compressor and condenser, substantially all the refrigerant is placed in a liquid state;

passing the refrigerant to an expansion device that expands the refrigerant while passing it to the evaporator, which allows for the refrigerant to be vaporized in the evaporator as the air at $T_{A1}$ is cooled;

passing a first heat-sink coolant at a temperature $T_{HS1}$ over a heat-sink coolant cooler to lower the temperature of the heat-sink coolant to a temperature $T_{HS2}$ to form a second heat-sink coolant;

passing the second heat-sink coolant over the condenser to remove heat from the refrigerant in the condenser; and passing the refrigerant through a heat exchange to reject heat to water and then using the water as a supply source for a water heater.

24. A refrigerant cooling system comprising:

an evaporator for removing heat from the air to be cooled such that the temperature is lowered from $T_{A1}$ to $T_{A2}$ and whereby the removed heat is delivered to the refrigerant in the evaporator and whereby the refrigerant is vaporized, a compressor fluidly coupled to the evaporator to receive refrigerant therefrom and to increase the pressure of the refrigerant, a condenser fluidly coupled to the compressor for receiving refrigerant from, the compressor and cooling the refrigerant, whereby the compressor and condenser are operable to convert the refrigerant to a liquid state, and an expansion valve fluidly coupled to the condenser for receiving liquid refrigerant from the condenser end for lowering the pressure of the refrigerant, the expansion valve also being fluidly coupled to the evaporator for delivering the refrigerant to the evaporator;

a heat-sink coolant cooler subsystem that uses water to cool a heat-sink coolant before the heat-sink coolant passes over the condenser; and wherein the device for producing a water mist comprises a piezo-electric ultrasonic nebulizer.

25. A refrigerant cooling system comprising:

an evaporator for removing heat from the air to be cooled such that the temperature is lowered from $T_{A1}$ to $T_{A2}$ and whereby the removed heat is delivered to the refrigerant in the evaporator and whereby the refrigerant is vaporized, a compressor fluidly coupled to the evaporator to receive refrigerant therefrom and to increase the pressure of the refrigerant, a condenser fluidly coupled to the compressor for receiving refrigerant from the compressor arid cooling the refrigerant, whereby the compressor and condenser are operable to convert the refrigerant to a liquid state, and an expansion valve fluidly coupled to the condenser for receiving liquid refrigerant from the condenser and for lowering the pressure of the refrigerant, the expansion valve also being fluidly coupled to the evaporator for delivering the refrigerant to the evaporator;

a heat-sink coolant cooler subsystem that uses water to cool a heat-sink coolant before the heat-sink coolant passes over the condenser;

a plurality of sensors for measuring characteristics of the heat-sink coolant and the compressor load; and a controller coupled to the plurality of sensors and to the heat-sink coolant cooler subsystem, the controller operable to control the severity of cooling performed by the heat-sink cooler subsystem in response to inputs from the sensors.

26. The system of claim 25 wherein the controller is operable to be remotely controlled.

27. A method for cooling air with a refrigerant system, the method comprising:

passing air, which is at a temperature $T_{A1}$, that is to be cooled over an evaporator that contains a refrigerant that becomes vaporized and that removes heat from the air to produce conditioned air at a temperature $T_{A2}$, where $T_{A2}<T_{A1}$;

passing the refrigerant to a compressor where the vaporized refrigerant is compressed;

passing the refrigerant to a condenser unit that removes heat from the refrigerant such that between the refrigerant passing the compressor and condenser, substantially all the refrigerant is placed in a liquid state;

passing the refrigerant to an expansion device that expands the refrigerant while passing it to the evaporator, which allows for the refrigerant to be vaporized in the evaporator as the air at $T_{A1}$ is cooled;

passing a first heat-sink coolant at a temperature $T_{HS1}$ over a heat-sink coolant cooler to lower the temperature of the heat-sink coolant to a temperature $T_{HS2}$ to form a second heat-sink coolant; and passing the second heat-sink coolant over the condenser to remove heat from the refrigerant in the condenser; and further comprising adjusting the extent of cooling performed by the heat-sink coolant cooler with a controller coupled to the coolant cooler; and wherein the first heat-sink coolant comprises air and wherein the step of passing the second heat-sink coolant over the condenser comprises passing the second heat-sink coolant over first and second condenser coils, at least one of the first and second condenser coils being a bypassable condenser coil so that said at least one of the first and second condenser coils may be taken off-line while allowing the refrigeration system to operate.

28. The method of claim 27 further comprising the step of spraying water to be evaporated on the first condenser coil.

29. The method of claim 27 further comprising the step of dripping water to be evaporated on the first condenser coil.

30. The method of claim 27 further comprising the step of passing the refrigerant through a heat exchange to reject heat to water and then using the water as a supply source for a water heater.

31. An improved refrigerant cooling system comprising:
an evaporator for removing heat from the air to be cooled such that the temperature is lowered from $T_{A1}$ to $T_{A2}$ and whereby the removed heat is delivered to the refrigerant in the evaporator and whereby the refrigerant is vaporized,
a compressor fluidly coupled to the evaporator to receive refrigerant therefrom and to increase the pressure of the refrigerant,
a condenser fluidly coupled to the compressor for receiving refrigerant from the compressor and cooling the refrigerant, whereby the compressor and condenser are operable to convert the refrigerant to a liquid state, and
an expansion valve fluidly coupled to the condenser for receiving liquid refrigerant from the condenser and for lowering the pressure of the refrigerant, the expansion valve also being fluidly coupled to the evaporator for delivering the refrigerant to the evaporator;
a heat-sink coolant cooler subsystem that uses sprayed water to cool a heal-sink coolant before it passes over the condenser; and
a controller coupled to the coolant cooler subsystem for adjusting the extent of cooling performed by the heat-sink coolant cooler subsystem; and wherein
the heat-sink coolant cooler subsystem includes a bypassable first condenser coil; a second condenser coil; and a means for preparing a water mist and delivering directly onto the first condenser coil.

32. A method for cooling air with a refrigerant system, the method comprising:
passing air, which is at a temperature $T_{A1}$, that is to be cooled over an evaporator that contains a refrigerant that becomes vaporized and that removes beat from the air to produce conditioned air at a temperature $T_{A2}$, where $T_{A2}<T_{A1}$;
passing the refrigerant to a compressor where the vaporized refrigerant is compressed;
passing the refrigerant to a condenser unit that removes beat from the refrigerant such that between the refrigerant passing the compressor and condenser, substantially all the refrigerant is placed in a liquid state;
passing the refrigerant to an expansion device that expands the refrigerant while passing it to the evaporator, which allows for the refrigerant to be vaporized in the evaporator as the air at $T_{A1}$ is cooled;
passing a first heat-sink coolant at a temperature $T_{HS1}$ over a heat-sink coolant cooler to lower the temperature of the heat-sink coolant to a temperature $T_{HS2}$ to form a second heat-sink coolant; and
passing the second heat-sink coolant over the condenser to remove heat from the refrigerant in the condenser; and further comprising
adjusting the extent of cooling performed by the heat-sink coolant cooler with a controller coupled to the coolant cooler; and wherein
a power-providing entity controls the water flow from the remote, off-premise location based upon at least one of ambient temperature condition, and power consumption.

* * * * *